(12) United States Patent
Leinonen et al.

(10) Patent No.: US 8,216,957 B2
(45) Date of Patent: Jul. 10, 2012

(54) CATALYST PREPARATION USING $H_2$

(75) Inventors: Timo Leinonen, Tolkkinen (FI); Peter Denifl, Helsinki (FI); Anssi Haikarainen, Tuusula (FI)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 12/737,262

(22) PCT Filed: Jun. 22, 2009

(86) PCT No.: PCT/EP2009/057712
§ 371 (c)(1),
(2), (4) Date: Dec. 21, 2010

(87) PCT Pub. No.: WO2009/156355
PCT Pub. Date: Dec. 30, 2009

(65) Prior Publication Data
US 2011/0098428 A1    Apr. 28, 2011

(30) Foreign Application Priority Data

Jun. 26, 2008  (EP) ................ 08159094

(51) Int. Cl.
*C08F 4/60*  (2006.01)
(52) U.S. Cl. ..... 502/127; 502/103; 502/118; 526/124.2; 526/124.3
(58) Field of Classification Search ........ 526/124.3, 526/124.2; 502/103, 118, 127
See application file for complete search history.

(56) References Cited

U.S. PATENT DOCUMENTS

| | | | |
|---|---|---|---|
| 4,048,109 A * | 9/1977 | Ryu | ............. 502/181 |
| 4,294,948 A | 10/1981 | Toyota et al. | |
| 5,409,875 A | 4/1995 | Hsu et al. | |
| 5,413,979 A | 5/1995 | Kostiainen et al. | |
| 2006/0166814 A1 * | 7/2006 | Leinonen et al. | ............. 502/103 |

FOREIGN PATENT DOCUMENTS

| | | |
|---|---|---|
| EP | 0 083 073 | 7/1983 |
| EP | 0 083 074 | 7/1983 |
| EP | 0 731 886 | 5/1996 |
| EP | 0 887 379 | 12/1998 |
| EP | 0 926 165 | 6/1999 |
| EP | 0 949 280 | 10/1999 |
| EP | 0 856 013 | 7/2000 |
| EP | 1 273 595 A1 | 1/2003 |
| EP | 1 403 292 A1 | 3/2004 |
| EP | 1 489 110 A1 | 12/2004 |
| EP | 1 273 595 B1 | 6/2006 |
| EP | 1 717 269 A1 | 11/2006 |
| EP | 1 862 480 A1 | 12/2007 |
| EP | 1 862 481 A1 | 12/2007 |
| EP | 1 862 482 A1 | 12/2007 |
| EP | 1 939 227 A1 | 7/2008 |
| WO | WO 92/12182 | 7/1992 |
| WO | WO 97/14723 | 4/1997 |
| WO | WO 00/08073 | 2/2000 |
| WO | WO 00/08074 | 2/2000 |
| WO | WO 01/55230 | 8/2001 |
| WO | WO 03/000754 A1 | 1/2003 |
| WO | WO 03/000757 A1 | 1/2003 |
| WO | WO 2004/029112 A1 | 4/2004 |

* cited by examiner

*Primary Examiner* — Ling-Siu Choi

(74) *Attorney, Agent, or Firm* — Warn Partners, P.C.

(57) ABSTRACT

The invention refers to a process for preparing a Group 2 metal/transition metal olefin polymerization catalyst component in particulate form having improved polymerization properties due to the use of $H_2$ during catalyst component preparation and the use of such catalyst components in a process for polymerizing olefins.

11 Claims, No Drawings

CATALYST PREPARATION USING $H_2$

This application is a National Stage of International Application No. PCT/EP2009/057712, filed Jun. 22, 2009. This application claims priority to European Patent Application No. 08159094.5 filed on Jun. 26, 2008. The disclosures of the above applications are incorporated herein by reference.

The present invention relates to a process for the production of Ziegler-Natta catalysts, to the catalyst as such, as well as to the use of the catalyst for polymerizing olefins, particularly for polypropylene.

BACKGROUND ART

Ziegler-Natta (ZN) type polyolefin catalysts are well known in the field of polymers, generally, they comprise (a) at least a catalyst component formed from a transition metal compound of Group 4 to 6 of the Periodic Table (IUPAC, Nomenclature of Inorganic Chemistry, 1989), a metal compound of Group 1 to 3 of the Periodic Table (IUPAC), and, optionally, a compound of group 13 of the Periodic Table (IUPAC) and/or an internal donor compound. ZN catalysts may also comprise (b) further catalyst component(s), such as a cocatalyst and/or an external donor.

Various methods for preparing ZN catalysts are known in the state of art. In one known method, a supported ZN catalyst system is prepared by impregnating the catalyst components on a particulate support material. In WO-A-01 55 230, the catalyst component(s) are supported on a porous, inorganic or organic particulate carrier material, such as silica.

In a further well known method the carrier material is based on one of the catalyst components, e.g. on a magnesium compound, such as $MgCl_2$. This type of carrier material can also be formed in various ways. EP-A-713 886 of Japan Olefins describes the formation of $MgCl_2$ adduct with an alcohol which is then emulsified and finally the resultant mixture is quenched to cause the solidification of the droplets.

Alternatively, EP-A-856 013 of BP discloses the formation of a solid Mg-based carrier, wherein the Mg-component containing phase is dispersed to a continuous phase and the dispersed Mg-phase is solidified by adding the two-phase mixture to a liquid hydrocarbon.

The formed solid carrier particles are normally treated with a transition metal compound and optionally with other compounds for forming the active catalyst.

Accordingly, in case of external carriers, some examples of which are disclosed above, the morphology of the carrier is one of the defining factors for the morphology of the final catalyst.

One disadvantage encountered with the supported catalyst systems is that a possible surface treatment (impregnation step) of the support with one or more catalytically active compounds may lead to non-uniform distribution of the active component(s) within the catalyst particle and further between the separate particles (intra- and inter-particle inhomogeneity) and in turn to an inhomogeneous polymer material.

Further, support material will remain in the final polymer as a residue, which is harmful in some polymer applications.

WO-A-00 08073 and WO-A-00 08074 describe further methods for producing a solid ZN-catalyst, wherein a solution of an Mg-compound and one or more further catalyst compounds are formed and the reaction product thereof is precipitated out of the solution by heating the system. Furthermore, EP-A-0 926 165 discloses another precipitating method, wherein a mixture of $MgCl_2$ and Mg-alkoxide is precipitated together with a Ti-compound to give a ZN catalyst.

EP-A-0 083 074 and EP-A-0 083 073 of Montedison disclose methods for producing a ZN catalyst or a precursor thereof, wherein an emulsion or dispersion of Mg and/or Ti compound is formed in an inert liquid medium or inert gas phase and said system is reacted with an Al-alkyl compound to precipitate a solid catalyst. According to examples said emulsion is then added to a larger volume of Al-compound in hexane and pre-polymerized to cause the precipitation.

In general, a drawback of such precipitation methods is the difficulty to control the precipitation step and thus the morphology of the precipitating catalyst particles.

Furthermore, the precipitation of the catalyst component(s) results in formation of a broad particle size distribution of catalyst particles comprising particles from very small particles to big agglomerates. Further, the morphology of the catalyst would then of course be lost. In polymerization processes this causes in turn undesired and harmful disturbances, like plugging, particle agglomeration, formation of polymer layers on the walls of the reactor etc., and also in lines and further equipment.

U.S. Pat. No. 5,413,979 describes a further method for the preparation of a solid procatalyst composition wherein support materials are impregnated with catalyst component precursors in order to obtain a catalyst component.

U.S. Pat. No. 4,294,948 finally discloses a process for preparing an olefin polymer or copolymer, employing a solid titanium catalyst component prepared by treating pulverized catalyst precursors with organometallic compounds of a metal of any of groups I or III of the Periodic Table, characterized in that the catalyst preparation occurs using pulverized, solid and particulate precursor materials.

EP-A-1 403 292, EP-A-0 949 280, U.S. Pat. Nos. 4,294,948, 5,413,979 and 5,409,875 as well as EP-A-1 273 595 describe processes for the preparation of olefin polymerization catalyst components or olefin polymerization catalysts as well as processes for preparing olefin polymers or copolymers.

Further several documents describe a special emulsion/solidification technology. WO 03/000757 as well as WO 03/000754 describes a process for the preparation of an olefin polymerization catalyst component, enabling to prepare solid particles of a catalyst component comprising a group 2 metal together with a transition metal, using emulsion/solidification technology.

WO 2004/029112 discloses a further process for preparing an olefin polymerization catalyst component using emulsion/solidification technology, wherein the process is further characterized in that a specific aluminium alkyl compound is brought into contact with the catalyst component, enabling a certain degree of activity increase at higher temperatures.

EP-A-1 862 481 describes also a process for preparing an olefin polymerization catalyst component using emulsion/solidification technology, wherein the control of catalytic activity is achieved by decreasing the amount of titanium present in the solidified particles of the olefin polymerization catalyst component being present in the oxidation state +4 by adding a reducing agent.

EP-A-1 862 482 describes a process for preparing an olefin polymerization catalyst component using emulsion/solidification technology, wherein the process is further characterized in that a specific aluminium alkoxy compound is brought into contact with the catalyst component, enabling a certain degree of activity increase at higher temperatures.

For typical ZN catalyst systems it is known that the control of the molecular weight distribution (MWD), in particular if narrow MWD polymers are desired, is difficult to accomplish, so that for typical narrow MWD polyolefin materials single site catalysts (SSC) are used. Since these single site catalysts are much more expensive, more poison sensitive and more difficult to operate in the plant than ZN catalysts it would however be a great advantage if also ZN catalysts, which allow a control of MWD, in particular in combination with reasonable high catalyst activity, would be available.

In EP-A-1 717 269 it is described that with catalysts, prepared according to WO 03/000754, WO 03/000757 and especially WO 2004/029112, it is possible to obtain polymer compositions, preferably propylene homo- or copolymers, more preferably propylene homopolymers, with a narrower MWD distribution compared to polymer compositions obtained with other Ziegler-Natta catalysts. Furthermore the polymer compositions have a decreased xylene soluble (XS) content compared to polymer compositions obtained with other Ziegler-Natta catalysts.

According to the Examples of EP-A-1 717 269 MWDs between 4.0 and 7.1 have been achieved using catalysts according to WO 03/000754, WO 03/000757 and WO 2004/029112 for the polymerization of propylene in combination with triethyl aluminium as cocatalyst and dimethoxysilane or dicyclopentyl dimethoxysilane as external donor in a 5 liter reactor. (see Examples 1-3 and 3A-10A)

All catalyst according to EP-A-1 717 269 have been prepared under inert conditions in nitrogen atmosphere.

For certain applications, e.g. fibres, it is desirable to have a polymer with even narrower MWD down to 3. A narrow MWD improves the mechanical properties. Further, the narrower the MWD, the faster fibres can be prepared, which results in an increase of the production rate.

Accordingly, although much development work has been done in the field of Ziegler-Natta catalysts, there remains a need for alternative or improved methods of producing ZN catalysts with desirable properties.

It is of particular interest to obtain a catalyst in particulate form which results in good and desired polymer properties and enables the control of MWD, and possibly also further polymer properties, such as content of xylene solubles (XS).

It is therefore an object of the invention to provide a catalyst component, yielding a catalyst with reasonable high activity enabling the production of polyolefins, especially polypropylenes, with narrow MWD values down to 3.0, and preferably allowing also controlling the XS.

DESCRIPTION OF THE INVENTION

In order to solve the above-identified objects, the present invention provides a process as defined in claim 1. Preferred embodiments thereof are described in the dependent subclaims as well as in the following description. The present invention furthermore provides an olefin polymerization catalyst component, an olefin polymerization catalyst as well as the use thereof for the polymerization of olefins.

It has been surprisingly found by the inventors of the present invention that catalyst particles having a good morphology, size and uniform particle size distribution can be obtained by the way of preparing Ziegler-Natta (ZN) type catalysts, for use in olefin polymerization, in particular for propylene polymerization, identified in the prior art cited above, showing furthermore an increase of the control of molecular weight distribution and of XS. The produced catalyst components according to the invention have excellent morphology, good particle size distribution and yield polymerization catalysts having a fully satisfactory activity and allowing the desired control of the MWD and XS.

According to the replica effect, the polymer particles produced by using the inventive catalyst have very good morphological properties, too. The inventive catalyst preparation is based on a liquid/liquid two-phase system where no separate external carrier materials such as silica or $MgCl_2$ are needed in order to get solid catalyst particles.

The present invention is therefore directed to a process for preparing an olefin polymerization catalyst component in the form of particles having a predetermined average size range of 5 to 200 μm under oxygen and moisture free conditions, said process comprising the steps of:

a) preparing a solution of a complex of a Group 2 metal and an electron donor by reacting a compound of said metal with said electron donor or a precursor thereof in an organic liquid reaction medium, b) adding said solution of said complex to at least one compound of a transition metal to produce an emulsion, wherein the dispersed phase of which is in the form of droplets and contains more than 50 mol % of the Group 2 metal in said complex, c) agitating the emulsion in order to maintain the droplets of said dispersed phase within said predetermined average size range, d) solidifying said droplets of the dispersed phase, e) washing the solidified particles at least once, f) drying the solidified particles or slurring the solidified particles to an oily liquid without drying and optionally g) recovering the dried or slurried solidified particles of the olefin polymerization catalyst component, wherein $H_2$-gas is added to at least one of the production steps a) to g).

Polymerization processes, where the catalyst components of the invention are useful comprise at least one polymerization stage carried out in at least one polymerization reactor. Typically the polymerization process comprises additional polymerization stages or reactors. In one particular embodiment the process contains at least one slurry reactor zone and at least one gas phase reactor zone, each zone comprising at least one reactor and all reactors being arranged in cascade. In one particularly preferred embodiment the polymerization process for polymerizing olefins, in particular propylene optionally with comonomers, like ethylene or other α-olefins, comprises at least one slurry, preferably bulk loop reactor, and at least one gas phase reactor arranged in that order. In some preferred processes the process comprises one bulk reactor and at least two gas phase reactors. The process may further comprise pre- and post reactors. Pre-reactors comprise typically pre-polymerization reactors. Polymerization processes which can be used are for example described in EP-A-1 717 269. Preferred multistage processes are "loop-gas phase" processes, such as developed by Borealis, known as BORSTAR® technology and described e.g. in the patent literature, such as in EP-A-0 887 379 or in WO 92/12182.

The inventors surprisingly found that by adding $H_2$-gas during the preparation of the catalyst component under oxygen and moister free conditions as described in claim 1, during at least one of the production steps a) to g) up to during all of the production steps a) to g), a catalyst component is obtained yielding a polymerization catalyst having a clearly improved ability to control MWD and XS.

It is a clear advantage that the MWD of the polymer produced can be controlled by adding $H_2$-gas during the preparation of the catalyst component instead of other MWD controlling compounds, especially for applications having strict purity requirements, since $H_2$ is not present/not detectable in the final polymer in comparison to these other MWD controlling compounds. This is a clear benefit, because high purity is of increasing importance in the polymer field.

In addition also the XS content can be controlled while not sacrificing polymerization activity, without destroying the excellent catalyst morphology or, subsequently, polymer morphology.

According to the present invention catalyst preparation is to be carried out under oxygen and moister free conditions. In general, this means that catalyst preparation is performed under an inert gas atmosphere. Typical inert gases suitable for such catalyst preparations are for example argon and nitrogen.

According to one specific embodiment of the present invention the inert gas, like for example nitrogen, used according to the state of the art for providing inert (oxygen and moisture free) conditions can be replaced totally or partially with $H_2$ from 5% up to 100% (Vol %) during the preparation of the catalyst component.

Thus, preferably a mixture of $H_2$ and $N_2$, for example a Formier gas, is used for preparing the catalyst component according to the invention.

The Vol %-ratio between $N_2$ and $H_2$ of the preferably used Formier gas can vary from 95:5 to 70:30.

Formier gases are commercially available with the following Vol %-ratio ($N_2/H_2$): 95/5; 92/8; 90/10; 85/15; 80/20 and 70/30.

According to the present invention Formier gases with a Vol %-ratio ($N_2/H_2$) of 95/5; 92/8; 90/10; 85/15 are preferred. More preferably a Formier gas with a Vol %-ratio ($N_2/H_2$) of 95/5 or 90/10 is used.

However, it has to be understood that use of a Formier gas is only one practical possibility to incorporate $H_2$ into the catalyst preparation. It is naturally possible that the reactions are carried out under an inert gas atmosphere using $N_2$ or e.g. argon gas, but $H_2$-gas being added separately at any desired step into the system.

The $H_2$ or the Formier gas can be added according to the invention to at least one of the production steps a) to g) up to during all of the production steps a) to g).

Preferably the $H_2$ or the Formier gas is added during washing (step e); during drying (step f); during washing and drying or recovering (step e and f or g); during or after slurring the solidified particles to an oily liquid without drying (step f), during step g); during step a) to step f) or during the whole preparation process (step a to step g).

The inventors found out that the $H_2$-gas, preferably the Formier-gas, to be used in the present invention as defined in claim 1 surprisingly enables a control of the MWD and also of XS. Typically the catalyst component of the present invention enables the preparation of narrow MWD polymers, such as polymers with a MWD of below 4, although a ZN catalyst system is employed for polymerization. The present invention enables the preparation of polymers with MWD values of as low as 3.8 or below, even below 3.6, such as from 3.3 to 3.5. It is even possible to achieve a MWD as low as 3.0 by using the catalyst component and catalyst according to the present invention. Polymers prepared under identical conditions, and with the same catalysts, i.e. solid catalysts without any external carrier, however with the exception of the addition of a $H_2$-gas, preferably a Formier-gas during the catalyst preparation, display MWD values typically being at least 10 to 15% higher, and typically 4 or more. Conventional supported ZN catalysts produce polypropylene having a MWD close to 5 or above. It has to be noted that the possibility to narrow the MWD from 4 to e.g. 3.4 or lower by using a ZN catalyst is remarkable and gives beneficial possibilities to control polymer properties. Further the catalyst component prepared in accordance with the present invention also allows a control of XS of the polymers produced, typically a decrease of XS, compared to the same catalysts, i.e. solid catalysts without any external carrier, prepared however with the exception of the addition of a $H_2$-gas during the catalyst preparation.

The general principles of the preparation of an olefin polymerization catalyst component in the form of particles having a predetermined size range under inert conditions are described for example in WO 03/000757, WO 03/000754, WO 2004/029112, EP 1 862 481, EP 1 862 482 and EP 1 717 269.

The patents referred to in this specification are incorporated by reference herein.

The Group 2 metal used in step a) of the inventive process is preferably magnesium, and the liquid organic reaction medium comprises preferably a $C_6$-$C_{10}$ aromatic hydrocarbon, preferably toluene.

As electron donor compound to be reacted with the Group 2 metal compound is preferably a mono- or diester of an aromatic carboxylic acid or diacid, the latter being able to form a chelate-like structured complex. Said aromatic carboxylic acid ester or diester can be formed in situ by reaction of an aromatic carboxylic acid chloride or diacid dichloride with a $C_2$-$C_{16}$ alkanol and/or diol, and is preferable dioctyl phthalate.

The reaction for the preparation of the Group 2 metal complex is generally carried out at a temperature of 20° to 80° C., and in case that the Group 2 metal is magnesium, the preparation of the magnesium complex is carried out at a temperature of 50° to 70° C.

The complex of the Group 2 metal is preferably a magnesium complex.

The compound of a transition metal is preferably a compound of a Group 4 metal. The Group 4 metal is preferably titanium, and its compound to be reacted with the complex of a Group 2 is preferably a halide.

In a further embodiment of the invention, a compound of a transition metal used in the process can also contain organic ligands typically used in the field known as a single site catalyst.

In a still further embodiment of the invention, a compound of a transition metal can also be selected from Group 5 metals, Group 6 metals, Cu, Fe, Co, Ni and/or Pd compounds.

The invention will henceforth be described in relation to a preferred embodiment of the process, namely to a process for the preparation of a Ziegler-Natta type catalyst.

In a preferred embodiment, the present invention is directed to a process for producing catalyst components of the Ziegler-Natta type in the form of particles having a predetermined size range, said process comprising: preparing a solution of magnesium complex by reacting an alkoxy magnesium compound and an electron donor or precursor thereof in a $C_6$-$C_{10}$ aromatic liquid reaction medium; reacting said magnesium complex with a compound of at least one four-valent Group 4 metal at a temperature greater than 10° C. and less than 60° C. to produce an emulsion of a denser, $TiCl_4$/toluene-insoluble, oil dispersed phase having Group 4 metal/Mg mol ratio 0.1 to 10 in an oil disperse phase having Group 4 metal/Mg mol ratio 10 to 100; agitating the emulsion, optionally in the presence of an emulsion stabilizer and/or a turbulence minimizing agent, in order to maintain the droplets of said dispersed phase within an average size range of 5 to 200 μm. The catalyst particles are obtained after solidifying said particles of the dispersed phase e.g. by heating.

The said disperse and dispersed phases are thus distinguishable from one another by the fact that the denser oil, if contacted with a solution of titanium tetrachloride in toluene, will not or only to a small degree dissolve in it. A suitable solution for establishing this criterion would be one having a toluene mol ratio of 0.1 to 0.3. They are also distinguishable by the fact that the great preponderance of the Mg provided (as complex) for the reaction with the Group 4 metal compound is present in the dispersed phase, as revealed by comparison of the respective Group 4 metal/Mg mol ratios.

In effect, therefore, virtually the entirety of the reaction product of the Mg complex with the Group 4 metal—which is the precursor of the ultimate catalyst component—becomes the dispersed phase, and proceeds through the further processing steps to the final particulate form. The disperse phase, still containing a useful quantity of Group 4 metal, can be reprocessed for recovery of that metal.

The production of a two-phase, rather than single-phase (as in prior practice) reaction product is encouraged by carrying out the Mg complex/Group 4 metal compound reaction at low temperature, specifically above 10° C. but below 60° C., preferably between above 20° C. and below 50° C. Since the two phases will naturally tend to separate into a lower, denser phase and supernatant lighter phase, it is necessary to maintain the reaction product as an emulsion by agitation, preferably in the presence of an emulsion stabiliser.

The resulting particles from the dispersed phase of the emulsion are of a size, morphology (spherical shape) and uniformity which render the ultimate catalyst component extremely effective in olefin polymerization. This morphology is preserved during the heating to solidify the particles, and of course throughout the final washing and optional drying steps. It is, by contrast, difficult to the point of impossibility to achieve such morphology through precipitation, because of the fundamental uncontrollability of nucleation and growth, and the large number of variables which affect these events.

Furthermore, emulsifying agents/emulsion stabilisers can be used additionally in a manner known in the art for facilitating the formation and/or stability of the emulsion. For the said purposes e.g. surfactants, e.g. a class based on acrylic or methacrylic polymers can be used. Preferably, said emulsion stabilizers are acrylic or methacrylic polymers, in particular those with medium sized ester side chains having more than 10, preferably more than 12 carbon atoms and preferably less than 30, and preferably 12 to 20 carbon atoms in the ester side chain. Particular preferred are unbranched $C_{12}$ to $C_{20}$-acrylates such as poly(hexadecyl)methacrylate and poly(octadecyl)methacrylate.

Furthermore, in some embodiments a turbulence minimizing agent (TMA) can be added to the reaction mixture in order to improve the emulsion formation and maintain the emulsion structure. By using said TMA, catalyst component particles can be obtained, said particles having very narrow size distribution.

Reaction mixture here means the solution from the initial organic liquid reaction medium, over the solution of the complex up to the emulsion before solidifying the particles of the dispersed phase of the emulsion.

Preferably, the TMA is added to the reaction mixture when the emulsion is formed, however in any case before solidification of the droplets of the dispersed phase starts in order to make sure that a quite uniform particle size distribution can be obtained.

Said TMA agent has to be inert and soluble in the reaction mixture under the reaction conditions, which means that polymers without polar groups are preferred.

Accordingly, said TMA or mixtures thereof are preferred as polymers having linear aliphatic carbon backbone chains, which might be branched with short side chains only in order to serve for uniform flow conditions when stirring. Said TMA is in particular preferably selected from α-olefin polymers of α-olefin monomers with 6 to 20 carbon atoms, like polyoctene, polynonene, polydecene, polyundecene or polydodecene or mixtures thereof, having the molecular weight and general backbone structure as defined before. Most preferable it is polydecene.

TMA can be added to the emulsion in an amount of e.g. 1 to 1.000 ppm, preferably 5 to 100 ppm and more preferable 5 to 50 ppm, based on the total weight of the reaction mixture.

It has been found that the best results are obtained when the Group 4 metal/Mg mol ratio of the denser oil is 1 to 5, preferably 2 to 4, and that of the disperse phase oil is 55 to 65. Generally the ratio of the mol ratio Group 4 metal/Mg in the disperse phase oil to that in the denser oil is at least 10.

Solidification of the dispersed phase droplets by heating is suitably carried out at a temperature of 70-150° C., usually at 80-110° C., preferably at 90-110° C.

The finally obtained catalyst component is desirably in the form of particles having generally an average size range of 5 to 200 μm, preferably 10 to 100, more preferably 20 to 50 μm.

The reagents can be added to the aromatic reaction medium in any order. However it is preferred that in a first step the alkoxy magnesium compound is reacted with a carboxylic acid halide precursor of the electron donor to form an intermediate; and in a second step the obtained product is further reacted with the Group 4 metal. The magnesium compound preferably contains from 1 to 20 carbon atoms per alkoxy group, and the carboxylic acid should contain at least 8 carbon atoms.

Reaction of the magnesium compound, carboxylic acid halide and polyhydric alcohol proceeds satisfactorily at temperatures in the range 20 to 80° C., preferably 50 to 70° C. The product of that reaction, the "Mg complex", is however reacted with the Group 4 metal compound at a lower temperature, contrary to previous practice, to bring about the formation of a two-phase, oil-in-oil, product.

Use of an aromatic medium for preparation of the Mg complex contributes to consistent product morphology and higher bulk density. Catalyst bulk density and morphology correlate with polymer product bulk density and morphology according to the so-called "replication effect".

The technique adopted in the novel regimen of the invention is inherently more precise than that formerly employed, and thus further contributes to product consistency, as well as sharply reducing the volumes of solvent to be handled and thus improving process economics.

The reaction medium used as solvent can be aromatic or a mixture of aromatic and aliphatic hydrocarbons, the latter one containing preferably 5-9 carbon atoms, more preferably 5-7 carbon atoms. Preferably, the liquid reaction medium used as solvent in the reaction is aromatic and is more preferably selected from hydrocarbons such as substituted and unsubstituted benzenes, preferably from alkylated benzenes, even more preferably from toluene and xylenes, and is most preferably toluene. The molar ratio of said aromatic medium to magnesium is preferably less than 10, for instance from 4 to 10, preferably from 5 to 9. Said aliphatic hydrocarbons can be added to the reaction mixture separately and are preferably added after the reaction of Mg complex with the $TiCl_4$.

For isolating the solidified particles the reaction mixture is allowed to settle and the solidified particles are recovered from this reaction mixture for example by syphoning or by an instream filtering unit.

The solidified particles are then washed (step e) at least once up to six times, preferably at least twice, most preferably at least three times with a hydrocarbon, which preferably is selected from aromatic and aliphatic hydrocarbons, preferably with toluene, particularly with hot (e.g. 80 to 100° C.) toluene, which might include a smaller or higher amount of $TiCl_4$ in it. The amount of $TiCl_4$ can vary from a few Vol % to more than 50 Vol %, such as from 5 Vol % to 50 Vol %, preferably up to 30 Vol % and more preferably from 5 to 15 Vol %. It is also possible that at least one wash is done with 100 Vol % $TiCl_4$. One or several further washes after aromatic and/or $TiCl_4$ washes can be run with aliphatic hydrocarbons of 4 to 8 carbon atoms. Preferable these latter washings are performed with heptane and/or pentane. Washings can be done with hot (e.g. 90° C.) or cold (room temperature) hydrocarbons or combinations thereof. It is also possible that all washings will be done with the same solvent, e.g. toluene.

The washing can be optimized to give a catalyst component with novel and desirable properties. Subsequently, the washed solidified particles are dried or slurried to an oily liquid without drying.

According to a further preferred embodiment of the present invention $H_2$ or a Formier gas, as defined above, can be added through the washing solutions during all the washing steps e).

The washed solidified particles can be further dried, as by evaporation, by flushing with nitrogen or according to the invention by adding $H_2$ or a Formier gas, as defined above, or it can be slurried to an oily liquid without any drying step.

$H_2$ or a Formier gas can also be used according to the invention during or after the preparation of the oil slurry.

In a further embodiment of the present invention ethylene can be added during all the washing steps (step e) and/or during or after the preparation of the oil slurry of the ready catalyst (step f) and or during recovering (step g) in addition to $H_2$ or to the Formier gas.

It is preferable that the intermediates as well as the final product of the process be distinct compounds with an essentially stoichiometric composition. Often, they are complexes. A complex is, according to Römpps Chemie-Lexicon, 7. Edition, Franckh'sche Verlagshandlung, W. Keller & Co., Stuttgart, 1973, page 1831, "a derived name of compounds of higher order, which originate from the combination of molecules,—unlike compounds of first order, in the creation of which atoms participate".

The alkoxy magnesium compound group is preferably selected from the group consisting of magnesium dialkoxides, complexes of a magnesium dihalide and an alcohol, and complexes of a magnesium dihalide and a magnesium dialkoxide. It may be a reaction product of an alcohol and a magnesium compound selected from the group consisting of dialkyl magnesiums, alkyl magnesium alkoxides, alkyl magnesium halides and magnesium dihalides. It can further be selected from the group consisting of dialkyloxy magnesiums, diaryloxy magnesiums, alkyloxy magnesium halides, aryloxy magnesium halides, alkyl magnesium alkoxides, aryl magnesium alkoxides and alkyl magnesium aryloxides.

The magnesium dialkoxide may be the reaction product of a dialkyl magnesium of the formula $R_2Mg$, wherein each one of the two Rs is a similar or different $C_1$-$C_{20}$ alkyl, preferably a similar or different $C_4$-$C_{10}$ alkyl. Typical magnesium alkyls are ethylbutyl magnesium, dibutyl magnesium, dipropyl magnesium, propylbutyl magnesium, dipentyl magnesium, butylpentylmagnesium, butyloctyl magnesium and dioctyl magnesium. Most preferably, one R of the formula $R_2Mg$ is a butyl group and the other R is an ethyl or octyl group, i.e. the dialkyl magnesium compound is butyl octyl magnesium or butyl ethyl magnesium.

Typical alkyl-alkoxy magnesium compounds RMgOR, when used, are ethyl magnesium butoxide, butyl magnesium pentoxide, octyl magnesium butoxide and octyl magnesium octoxide.

Dialkyl magnesium, alkyl magnesium alkoxide or magnesium dihalide can react with a monohydric alcohol R'OH, or a mixture thereof with a polyhydric alcohol $R'(OH)_m$.

Typical $C_1$-$C_{20}$ monohydric alcohols are methanol, ethanol, n-propanol, iso-propanol, n-butanol, iso-butanol, sec.butanol, tert.butanol, n-amyl alcohol, iso-amyl alcohol, sec. amyl alcohol, tert. amyl alcohol, diethyl carbinol, sec. isoamyl alcohol, tert. butyl carbinol. Typical $C_6$-$C_{10}$ monohydric alcohols are hexanol, 2-ethyl-1-butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, diisobutyl carbinol, 1-decanol and 2,7-dimethyl-2-octanol. Typical >$C_{10}$ monohydric alcohols are n-1-undecanol, n-1-dodecanol, n-1-tridecanol, n-1-tetradecanol, n-1-pentadecanol, 1-hexadecanol, n-1-heptadecanol and n-1 octadecanol. The monohydric alcohols may be unsaturated, as long as they do not act as catalyst poisons.

Preferable monohydric alcohols are those of formula R'OH in which R' is a $C_2$-$C_{16}$ alkyl group, most preferably a $C_4$-$C_{12}$ alkyl group, particularly 2-ethyl-1-hexanol.

The aromatic reaction medium may also contain a polyalcohol, which may have a straight- or branched-chain. Typical $C_2$ to $C_6$ polyhydric alcohols may be straight-chain or branched and include ethylene glycol, propylene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, and triols such as glycerol, methylol propane and pentareythritol. The polyhydric alcohol can be selected on the basis of the activity and morphology it, gives the catalyst component.

Preferably, essentially all of the aromatic carboxylic acid ester is a reaction product of a carboxylic acid halide, preferably a dicarboxylic acid dihalide, more preferably an unsaturated α,β-dicarboxylic acid dihalide, most preferably phthalic acid dichloride, with the monohydric alcohol.

The compound of a fourvalent Group 4 metal compound containing a halogen is preferably a titanium tetrahalide. Equivalent to titanium tetrahalide is the combination of an alkoxy titanium halide and a halogenation agent therefore, which are able to form a titanium tetrahalide in situ. The most preferred halide is the chloride, for zirconium and hafnium as well as for titanium.

The reaction conditions used in the claimed process may be varied according to the used reactants and agents.

As is known, the addition of at least one halogenated hydrocarbon during the process can lead to further improved catalytic activity. Reactive halogenated hydrocarbons preferably have the formula $R'''X'''_n$ wherein R''' is an n-valent $C_1$-$C_{20}$ hydrocarbyl group, particularly a $C_1$-$C_{10}$ paraffin, X''' is a halogen and n is an integer from 1 to 4.

Such chlorinated hydrocarbons include monochloromethane, dichloromethane, trichloromethane (chloroform), tetrachloromethane, monochloroethane, (1,1)-dichloroethane, (1,2)-dichloroethane, (1,1,1)-trichloroethane, (1,1,2)-trichloroethane, (1,1,1,2)-tetrachloroethane, (1,1,2,2) tetrachloroethane, pentachloroethane, hexachloroethane, (1)-chloropropane, (2)-chloropropane, (1,2)-dichloropropane, (1,3)-dichloropropane, (1,2,3)trichloropropane, (1)-chlorobutane, (2)-chlorobutane, isobutyl chloride, tert.butyl chloride, (1,4)-dichlorobutane, (1)-chloropentane, (1,5)-dichloropentane. The chlorinated hydrocarbons may also be unsaturated, provided that the unsaturation does not act as catalyst poison in the final catalyst component.

In the above formula, R''' is preferably a mono- or bivalent $C_1$-$C_{10}$ alkyl group, independently, X''' is preferably chlorine and, independently, n is preferably 1 or 2. Preferred compounds include butyl chloride (BuCl), dichloroalkanes such as (1,4)-dichlorobutane, and tertiary butyl chloride.

In addition, during the catalyst component preparation a reducing agent, which decreases the amount of titanium present in said solidified particles of the olefin polymerization catalyst component being present in the oxidation state +4, can be added.

Suitable reducing agents are aluminium alkyl compounds, aluminium alkyl alkoxy compounds as well as magnesium compounds as defined in the present specification.

Suitable aluminium compounds have a general formula $AlR_{3-n}X_n$, wherein R stands for a straight chain or branched alkyl or alkoxy group having 1 to 20, preferably 1 to 10 and more preferably 1 to 6 carbon atoms, X independently represents a residue selected from the group of halogen, preferably chloride, and n stands for 0, 1, 2 or 3, preferably 0, 1 or 2. At least one of the R residues has to be an alkyl group.

The compound can be added as an optional compound to the catalyst component synthesis and brought into contact with the droplets of the dispersed phase of the agitated emulsion before drying or slurring the solidified particles in step f). I.e. the Al compound can be added at any step a) to d), or during the washing step e), however, before step f). Reference is made to WO 2004/029112, EP-A-1 862 480 and to EP-A-1 862 481.

Illustrative examples of aluminium alkyl and alkoxy compounds to be employed in accordance with the present invention are:

Tri-($C_1$-$C_6$)-alkyl aluminium compounds and chlorinated aluminium alkyl compounds, especially diethyl aluminium chloride;

diethyl aluminium ethoxide, ethyl aluminium diethoxide, diethyl aluminium methoxide, diethyl aluminium propoxide, diethyl aluminium butoxide, dimethyl aluminium ethoxide, of which in particular diethyl aluminium ethoxide is preferred.

Suitable magnesium compounds are magnesium compounds as defined herein in connection with the complex of a Group 2 metal. The respective disclosure is incorporated herein by reference with respect to the magnesium compound to be added in accordance with the process of the present invention. In particular, suitable magnesium compounds are dialkyl magnesium compounds or halogenated alkyl magnesium compounds of the general formula $MgR_{2-n}X_n$, where each n is 0 or 1, and each R are same or different alkyl groups with 1 to 8 carbon atoms and X is halogen, preferably Cl. One preferred magnesium compound is butyloctyl magnesium (commercially available under the trade name BOMAG), which is already preferably used in the preparation of the Mg complex.

The optional Al or Mg compound is added in such an amount that the final catalyst component particles have Al content of 0.0 to 1 wt-%, preferably 0.1 to 0.8 wt-% or 0.2 to 0.5 wt-%. The preferred amounts depend to some extent on the Al compound, e.g. if an Al alkoxy compound is used, the preferred final Al amounts seem to be lower than if e.g. Al alkyl chloride compounds are used.

Preferably an Al alkyl or Al alkyl alkoxy compound, as defined above, is added.

Furthermore a small amount of a phosphorus compound can be added during the preparation of the catalyst component; preferably to the magnesium complex, the liquid/liquid two-phase system during the catalyst component preparation prior to solidification, or to the washing liquid (step e), but again before step f).

With the use of a small amount of a phosphorus compound in addition to the use of $H_2$ or Formier gas a catalyst component is obtained yielding a polymerization catalyst having an additional improved ability to control MWD. In addition also the XS content can be controlled while not sacrificing polymerization activity, without destroying the excellent catalyst morphology or, subsequently, polymer morphology. In addition the phosphorus content in the final catalyst is very low and in most cases below the detection limit, so that no further impurities are introduced into the polymer produced using the catalyst component of the present invention.

Accordingly, the addition of the phosphorus compound may be effected from step a) until the completion of the particle formation, i.e. step d), or thereafter, for example in a subsequent washing step to be carried out after step d) but prior to step f). The completion of the particle formation is usually achieved when the remaining toluene-soluble components have been washed out from the catalyst particles during solidifying said particles. Thus, the phosphorus compound can be preferably added, in pure form or in the form of a solution, from the beginning of the formation of the solution according to step a) until adding it to the washing liquid, mostly toluene. It is in particular preferred to add the phosphorus compound to the washing liquid.

The addition amount of the phosphorus compound is typically selected so that a molar ratio of Group 2 metal and phosphorus is within the range of 0.05 to 1, preferably 0.1 to 0.5, more preferably 0.1 to 0.3, and most preferably 0.15 to 0.25, such as about 0.2.

It has been found, that the amount of the final P content in the catalyst component is very small, and below the detection limit. However, in some embodiments small amounts of P can be detected in the final catalyst component, and the amount of P may be 0.8 wt.-% or less, preferably 0.6 wt.-% or less, more preferably 0.4 wt.-% or less.

The phosphorous compound to be used in accordance with the present invention typically is a compound comprising phosphorus in the oxidation state of +5 or +3, preferably +5. Suitable examples of phosphorus compounds of the oxidation state of phosphorus of +3 are phosphines, such as tri-alkyl or tri-aryl phosphines, such as tri-phenyl phosphine. Preferred however are, as indicated above, phosphorus compounds comprising phosphorus in the oxidation state +5. Particular examples thereof are compounds of the formula $O=P(R)_3$ wherein the three residues R may be identical or different and may be selected among halogens, including Cl, Br, and I, preferably Cl, alkyls, alkenyls, aryls, phenyls with 1 to 20 C-atoms, preferably 1 to 16, more preferably 1 to 12 C-atoms, wherein the groups optionally may be substituted once or twice, preferably with any of the groups identified above. Still more preferably R are alkyls with 1 to 16 C-atoms, preferably 1 to 12, more preferably 1 to 8 C-atoms or Cl, and a particular example is $O=PCl_3$ which may be suitably used in particular when wishing to add the phosphorus compound already in step a) or b). Another group of particular examples thereof are compounds of the formula $O=P(OR)_3$ wherein the three residues R may be identical or different and may be selected among alkyls, alkenyls, aryls, phenyls with 1 to 20 C-atoms, preferably 1 to 16, more preferably 1 to 12 C-atoms, wherein the groups optionally may be substituted once or twice, preferably with any of the groups identified above and halogens, including Cl, Br, and I. Still more preferably R are alkyls with 1 to 16 C-atoms, preferably 1 to 12, more preferably 1 to 8

C-atoms, and Alkyls with 2 to 6 C-atoms are especially useful, such as tributyl phosphate.

The aluminium alkyl or alkoxy compound, the magnesium compound and the phosphorus compound can be used alone or in combination.

The optional Al, Mg or P compound or a mixture thereof is preferably added before step f), more preferably during the washing step e), which comprises at least one, preferably two and more preferably three washing procedures with the same or preferably different hydrocarbons as washing medium.

The aluminium alkyl or alkoxy compound, magnesium compound and/or the phosphorus compound to be used in the catalyst component preparation of the invention can be added to any of the washing mediums, which are, as described above, preferably toluene, heptane and/or pentane.

Though the catalyst component preparation according to the inventive method can be carried out batch-wise, it is also preferable and possible to prepare the catalyst component semi-continuously or continuously. In such semi-continuous or continuous process, the solution of the complex of the group 2 metal and said electron donor, which is prepared by reacting the compound of said metal with said electron donor in an organic liquid reaction medium, is mixed with at least one compound of a transition metal, which might be solved in the same or different organic liquid reaction medium. The so obtained solution is then agitated, possibly in the presence of an emulsion stabilizer, and then the so-agitated emulsion is fed into a temperature gradient reactor, in which the emulsion is subjected a temperature gradient, thus leading to solidifying the droplets of a dispersed phase of the emulsion. The optional TMA is preferably contained in the solution of the complex or added to the solution before feeding the agitated solution to the temperature gradient reactor.

When feeding said agitated emulsion to the temperature gradient reactor, an inert solvent, in which the droplets are not soluble, can additionally be fed into that gradient reactor in order to improve the droplet formation and thus leading to a uniform grain size of the particles of the catalyst component, which are formed in the temperature gradient reactor when passing through said line. Such additional solvent might be the same as the organic liquid reaction medium, which is used for preparing the solution of the complex of the group 2 metal as explained above in more detail.

The solidified particles of the olefin polymerization catalyst component can subsequently be recovered by an in-stream filtering unit and then, optionally after some additional washing and drying steps in order to remove unreacted starting components, can be stored for further use. In one embodiment the catalyst can be fed after washing steps into the olefin polymerization reactor, so that a continuous preparation and feed to the reactor is guaranteed. It is also possible to mix the solidified and washed catalyst component with an oily fluidic liquid and store and use the catalyst component as catalyst component-oil slurry. In this way the drying steps can be avoided, which might be sometimes detrimental to the catalyst components morphology. This oil-slurry method is described in general in EP-A-1489110 of the applicant, incorporated herein by reference.

As it can be seen from the above description of the semi-continuous or continuous process, it is thus possible to use separated reaction vessels for the different process steps and to transfer the reaction products which are prepared in the respective reaction vessels and to feed them in-line into further reaction vessels for formation of the emulsion and, subsequently, of the solidified particles.

It is preferred to use a full-continuous process as the time saving in said process is remarkable. In such fully continuous process, the formation of the solidified particles could be carried out in the temperature gradient line in the kind of pipe reactor, which is sufficiently long and which is subjected said temperature gradient from the starting temperature in the lower range of 20 to 80° C. up to a "solidifying" temperature of 70 to 150° C. The temperature gradient is preferably obtained by means of heating the pipe reactor from the outside by applying normal heaters, microwaves, etc.

As mentioned before, a filtering unit might preferably be used for filtering the solidified particles from the solvent stream. For said filtering unit, various drums and sieving systems can be used, depending on the specific particle sizes.

As it is common knowledge, all steps have to be performed under an inert (oxygen and moisture free) atmosphere, which usually is a nitrogen atmosphere.

According to the invention $H_2$, preferably a Formier gas, can be added in several steps during the catalyst component preparation.

As already stated above there are several possibilities for adding $H_2$, preferably a Formier gas, optionally in combination with additional compounds like a reducing agent or ethylene gas, according to the present invention.

These preferred embodiments of the present invention are:
1) adding $H_2$ during steps a) to g),
2) or during steps a) to f)
3) adding $H_2$ only during washing e)
4) using $H_2$ only during drying in step f)
5) using $H_2$ during preparing the oil slurry in step f)
6) using $H_2$ during washing step e) and during step f) and/or step g).

Furthermore it is possible to combine the addition of $H_2$ (possibilities 1-6) with the additional use of a reducing agent, like an aluminium alkyl compound and/or a phosphorus compound. The reducing agent or a mixture is preferably added during the washing step e).

It is also possible to combine the addition of $H_2$ with the addition of ethylene during step e) and/or during the oil slurry in step f) (possibilities 3, 5 and 6).

In addition it is also possible to use a combination of $H_2$, reducing agent and ethylene during washing step e).

The flow rate of $H_2$, respectively of the Formier gas, is not critical and can—depending on the size of the reaction apparatus—vary in a broad range, since $H_2$ is not or only to a very small amount consumed during the preparation of the catalyst component.

If additionally ethylene is used, the flow rate of ethylene can also vary over a broad range. Preferably the flow rate of $H_2$, respectively of the Formier gas, and ethylene is the same.

The present invention further comprehends an olefin polymerization catalyst comprising a catalyst component prepared as aforesaid, in association with an alkyl aluminium cocatalyst and optionally external donors, typically silane based donors, and the use of that polymerization catalyst for the polymerization of $C_2$ to $C_{10}$-olefins.

The present invention also provides a process for polymerizing olefins. Preferably the olefins to be polymerized are olefins with 2 to 10 carbon atoms, in particular ethylene and/or propylene and most preferably propylene. Due to the use of the catalyst precursor in accordance with the present invention it is possible to control the MWD of the polymer produced to low values, of 3.8 or less, preferably 3.6 or less and more preferably 3.4 or less. MWD values of 3.3 to 3.5 and even as low as 3.0 are possible in accordance with the present invention by using the catalyst component and catalyst of the present invention. It is also possible to control the XS to low values, such as below 3 wt.-%, preferably below 2.5 wt.-%, and even below 2 wt.-%. XS values being even below 1.5 wt.-% are exemplified.

The catalysts of the invention are preferably used in polymerization of propylene optionally with comonomers selected from ethylene and/or other alpha-olefins of 4 to 10 carbon atoms. All generally known polymerization processes including solution, slurry and gas phase polymerization or any combinations thereof for producing polymer compositions can be used.

Slurry polymerization is preferably a bulk polymerization, where monomer is used as a reaction medium.

Polymerization can be carried out in a single or a multistage polymerization process. Preferably polymerization is carried out in a multistage process using one or more polymerization reactors, which may be the same or different, e.g. slurry and/or gas phase reactors or any combinations thereof. Each stage may be effected in parallel or sequentially using same or different polymerization method. In case of a sequential stages each components may be produced in any order by carrying out the polymerization in each step, except the first step, in the presence of the polymer component formed in the preceding step(s).

In a preferred process at least one component is produced by slurry process, preferably in bulk reactor. Bulk reactor is preferably a loop reactor. In one preferred multistage process a combination of at least one slurry reactor and at least one gas phase reactor is used. Additional gas phase reactors are possible.

A preferred multistage process is a "loop-gas phase"-process, such as developed by Borealis (known as BORSTAR® technology) described e.g. in patent literature, such as in EP-A-0 887 379.

Optionally, the process can further comprise a pre-polymerization step before the actual polymerization step.

A continuous polymerization process is preferred.

Preferably, the process is a multi(two)stage process as defined above, wherein the slurry polymerization is preferably carried out under the following conditions in a loop reactor:
 the temperature is within the range of 60° C. and 110° C., preferably in the range of 70-90° C., and in some special cases at 80° C. or above.
 the pressure is within the range of 20 bar to 80 bar, preferably between 30 bar to 60 bar,
 hydrogen can be added for controlling the molar mass in a manner known per se;
The reaction mixture from the slurry (bulk) reactor is transferred to the gas phase reactor, such as a fluidized bed reactor, where the conditions are preferably as follows:
 the temperature is within the range of 60° C. to 130° C., preferably between 70° C. and 100° C., and in some special cases at 80° C. or above.
 the pressure is within the range of 5 bar to 50 bar, preferably between 15 bar to 35 bar,
 hydrogen can be added for controlling the molar mass in a manner known per se.

The average residence time can vary being e.g. in loop is in the range 0.5 to 5 hours, and in gas phase reactor 1 to 8 hours.

If desired, in slurry step supercritical conditions can be used.

The gas phase polymerization may be conducted in a manner known in the art, such as in a fluidized bed or in an agitated bed. Also fast fluidization may be utilized.

A catalyst system used in the polymerization can comprise in addition to the catalyst component of the present invention any well known external donors, such as silane based external donors, and cocatalysts, such as aluminium alkyl cocatalysts.

Finally the present invention also provides olefin polymers. Preferably the olefins to be polymerized are olefins with 2 to 10 carbon atoms, in particular ethylene and/or propylene. Due to the use of the catalyst precursor in accordance with the present invention it is possible to control the MWD of the polymer produced, preferably a propylene homopolymer or copolymer, to low values of 3.9 or less, preferably 3.7 or less and more preferably 3.6 or less. MWD values of 3.3 to 3.5 and even as low as 3.0 are possible in accordance with the present invention by using the catalyst component and catalyst of the present invention. In embodiments of the present invention it is also possible to control the XS to low values, such as below 3 wt %, preferably below 2.5 wt %, and even below 2 wt %. XS values being even below 1.5 wt % are exemplified.

Some preferred embodiments of the invention are described, by way of illustration, in the following examples.
Methods:
In the examples the following measuring methods were used:

The melt flow rates were measured with a load of 2.16 kg and at 190° C. The melt flow rate ($MFR_2$) is that quantity of polymer in grams which the test apparatus standardized to ISO 1133 extrudes within 10 minutes at a temperature of 190° C. under a weight of 2.16 kg.

Determination of Xylene Soluble Fraction of product at 25° C. (XS)

2.0 g of polymer are dissolved in 250 ml p-xylene at 135° C. under agitation. After 30±2 minutes the solution is allowed to cool for 15 minutes at ambient temperature and then allowed to settle for 30 minutes at 25±0.5° C. The solution is filtered with filter paper into two 100 ml flasks.

The solution from the first 100 ml vessel is evaporated in nitrogen flow and the residue is dried under vacuum at 90° C. until constant weight is reached.

$$XS\% = (100 \times m_1 \times v_0)/(m_0 \times v_1)$$

$m_0$=initial polymer amount (g)
$m_1$=weight of residue (g)
$v_0$=initial volume (ml)
$v_1$ volume of analyzed sample (ml)
Molecular Weights, Molecular Weight Distribution (Mn, Mw, MWD)-GPC The weight average molecular weight Mw and the molecular weight distribution (MWD=Mw/Mn wherein Mn is the number average molecular weight and Mw is the weight average molecular weight) was measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL of sample solution were injected per analysis. The column set was calibrated using relative calibration with 19 narrow MWD polystyrene (PS) standards in the range of 0.5 kg/mol to 11 500 kg/mol and a set of well characterised broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Al, Ti and Mg amounts in catalyst components were measured by flame atomic absorption method. Samples of the catalyst components were dissolved in a mixture of nitric and hydrofluoric acid and the metals were measured by flame atomic absorption with a nitrous oxide/acetylene flame.

Determination of Phthalic Ester (Dioctyl Phthalate: DOP) Amount:

The determination of the phatalic esters (DOP) was done by first dissolving the sample in acetone. The dissolution was facilitated by keeping the acetone slurry in an ultra-sound bath for 5 minutes. After this the sample was filtered and run by solution chromatography. The component was identified by comparing the respective retention time and UV spectra with standard conditions.

Average particle size (APS) was determined by sieving the polymer powder according to ASTM D1921-06.

EXAMPLES

Examples 1

Preparation of the Mg Complex

A magnesium complex solution was prepared under inert conditions in a nitrogen atmosphere by adding, with stirring, 55.8 kg of a 20% solution in toluene of BOMAG ($Mg(Bu)_{1.5}(Oct)_{0.5}$) to 19.4 kg 2-ethylhexanol in a 150 l steel reactor. During the addition the reactor contents were maintained below 20° C. The temperature of the reaction mixture was then raised to 60° C. and held at that level for 30 minutes with stirring, at which time reaction was complete. 5.50 kg 1,2-phthaloyl dichloride was then added and stirring of the reaction mixture at 60° C. was continued for another 30 minutes. After cooling to room temperature a yellow solution was obtained.

Example 2

Preparation of the Catalyst Component with $H_2$ During Step e) and f)

19.5 ml titanium tetrachloride were placed in a 300 ml glass reactor equipped with a mechanical stirrer under inert conditions in a nitrogen atmosphere. Mixing speed was adjusted to 170 rpm. 28.4 g of the Mg-complex, prepared according to Example 1, were then added to the stirred reaction mixture over a 10-minute period. During the addition of the Mg-complex the reactor contents were maintained below 30° C.

1.0 ml of a solution of 3.0 mg polydecene (Necadd 447™) in toluene (tubular minimizing agent) and 2.0 ml Viscoplex™ 1-254 of RohMax Additives GmbH (a polyalkyl methacrylate with a viscosity at 100° C. of 90 $mm^2/s$ and a density at 15° C. of 0.90 g/ml) were then added, and after 5 minutes stirring at room temperature 10.0 ml of n-heptane was added.

Stirring was maintained at room temperature for 30 minutes.

The temperature of the reaction mixture was then slowly raised to 90° C. over a period of 20 minutes and held at that level for 30 minutes with stirring.

After settling and syphoning it was switched from N2 gas to Formier-gas ($N_2/H_2$=90/10; 10 ml/min) and the solids underwent washing with 100 ml toluene at 90° C. for 30 minutes, 60 ml heptane for 20 minutes at 90° C. and 60 ml pentane for 10 minutes at 25° C. Finally, the solids were dried at 60° C. under Formier-gas atmosphere ($N_2/H_2$=90/10), to yield an air-sensitive powder.

Al 0 wt %, Mg 12.6 wt %, Ti 3.5 wt %, Dioctyl phtalat (DOP) 23.4 wt %

Example 3

Preparation of the Catalyst Component with $H_2$ During Step a) to e) in Combination with Diethyl Aluminium Chloride (DEAC) and Tributyl Phosphate During Step e)

19.5 ml titanium tetrachloride were placed in a 300 ml glass reactor equipped with a mechanical stirrer under oxygen and moisture free conditions in a Formier gas atmosphere ($N_2/H_2$=90/10). Mixing speed was adjusted to 170 rpm. 28.4 g of the Mg-complex, prepared according to Example 1, were then added to the stirred reaction mixture over a 10-minute period. During the addition of the Mg-complex the reactor contents were maintained below 30° C.

Formier gas was slowly bubbled (10 ml/min) in the mixture through a needle for the rest of the synthesis.

1.0 ml of a solution of 3.0 mg polydecene (Necadd 447™) in toluene and 2.0 ml Viscoplex 1-254 of RohMax Additives GmbH (a polyalkyl methacrylate with a viscosity at 100° C. of 90 $mm^2/s$ and a density at 15° C. of 0.90 g/ml) were then added, and after 5 minutes stirring at room temperature 10.0 ml of n-heptane was added.

Stirring was maintained at room temperature for 30 minutes.

The temperature of the reaction mixture was then slowly raised to 90° C. over a period of 20 minutes and held at that level for 30 minutes with stirring.

After settling and syphoning the solids underwent washing with 100 ml toluene, where 0.11 ml of diethyl aluminium chloride (DEAC) and 1.36 ml tributyl phosphate were added, at 90° C. for 30 minutes, 60 ml heptane for 20 minutes at 90° C. and 60 ml pentane for 10 minutes at 25° C. Finally, the solids were dried at 60° C. by nitrogen purge to yield an air-sensitive powder.

Al wt % not determined, Mg 11.4 wt %, Ti 4.6 wt %, DOP 21.3 wt %

Example 4

Preparation of the Catalyst Component with $H_2$ During Step e) to f) in Combination with Ethylene 19.5 ml titanium tetrachloride were placed in a 300 ml glass reactor equipped with a mechanical stirrer under inert conditions in a nitrogen gas atmosphere. Mixing speed was adjusted to 170 rpm. 32 g of the Mg-complex, prepared according to Example 1, were then added to the stirred reaction mixture over a 10-minute period. During the addition of the Mg-complex the reactor contents were maintained below 30° C.

1.0 ml of a solution of 2.0 mg polydecene (Necadd 447™) and 2.0 ml Viscoplex 1-254 of RohMax Additives GmbH (a polyalkyl methacrylate with a viscosity at 100° C. of 90 $mm^2/s$ and a density at 15° C. of 0.90 g/ml) were then added, and after 5 minutes stirring at room temperature 10.0 ml of n-heptane was added.

Stirring was maintained at room temperature for 30 minutes.

The temperature of the reaction mixture was then slowly raised to 90° C. over a period of 20 minutes and held at that level for 30 minutes with stirring.

After settling and syphoning it was switched from N2 gas to Formier-gas ($N_2/H_2$=90/10; 10 ml/min). In addition ethylene (10 ml/min) was also bubbled through during washing. The solids underwent washing with 100 ml toluene, wherein 2 ml of diethyl aluminium chloride (DEAC) have been diluted, at 90° C. for 30 minutes, 60 ml heptane for 20 minutes at 90° C. and 60 ml pentane for 10 minutes at 25° C. Addition of ethylene was stopped. Finally, the solids were dried at 60° C. by Formier gas to yield an air-sensitive powder.

Al 0.23 wt %, Mg 12.4 wt %, Ti 4.0 wt %, DOP 34.2 wt %

Example 5

Preparation of the Catalyst Component with $H_2$ After Step f) in Combination with Ethylene a) Preparation of a Soluble Mg-Complex A magnesium complex solution was prepared by adding, with stirring, 78.0 kg of a 20% solution in toluene of BOMAG ($Mg(Bu)_{1.5}(Oct)_{0.5}$) to 27.0 kg 2-ethylhexanol in a 150 l steel reactor. During the addition the reactor contents were maintained below 40° C. After 30 minutes stirring, at which time reaction was complete, 7.8 kg 1,2-phthaloyl dichloride was added. After addition stirring of the reaction mixture at 60° C. was continued for 60 minutes. After cooling to room temperature a clear yellowish solution was obtained.

b) Catalyst Synthesis 24.0 kg titanium tetrachloride were placed in a 90 l steel reactor. 21.0 kg of Mg-complex were then added to the stirred reaction mixture over a period of two hours. During the addition of the Mg-complex the reactor contents were maintained below 35° C.

4.5 kg n-heptane and 1.05 l Viscoplex 1-254 of RohMax Additives GmbH (a polyalkyl methacrylate with a viscosity at 100° C. of 90 mm²/s and a density at 15° C. of 0.90 g/ml) were then added to the reaction mixture at room temperature and stirring was maintained at that temperature for a further 60 minutes.

The temperature of the reaction mixture was then raised to 90° C. over a period of 60 minutes and held at that level for 40 minutes with stirring. After settling and syphoning the solids underwent washing with a mixture of 0.244 l of a 30% solution in toluene of diethyl aluminium chloride and 50 kg toluene for 110 minutes at 90° C., 50 kg n-heptane for 50 minutes at 50° C., and 50 kg n-heptane for 50 minutes at 25° C. The synthesis was carried out under inert conditions using about one bar over pressure.

Finally, 4.0 kg white oil (Primol 352; viscosity at 100° C. of 8.5 mm²/s; density at 15° C. of 0.87 g/ml) was added to the reactor. The obtained oil slurry was stirred for a further 5 minutes at room temperature before the product was transferred to a storage container.

From the oil slurry a solids content of 22.2 wt % was analyzed.

The solid catalyst contained 0.23 w % aluminium, 15.4 w % magnesium, 4.5 w % titanium and 24.5 w % DOP.

20.2 g of the catalyst oil slurry and 100 ml of dry heptane were added to 300 ml glass reactor under inert conditions at room temperature. Mixing speed was adjusted to 300 rpm. Then ethylene and Formier gas was started to bubble through the mixture. After 20 min temperature was raised to 60° C. and bubbling of both gases was continued for 40 min. The feed of both gases was about 10 ml/min.

After cooling down to room temperature the catalyst was let to settle and the liquid was syphonated off. The resulting solid was washed ones with n-pentane (60 ml) and dried with $N_2$ purge.

Example 6-9

Bulk Polymerization of Propylene

The propylene bulk polymerization was carried out in a stirred 5 l tank reactor. About 0.9 ml triethyl aluminium (TEA) as a co-catalyst, ca 0.12 ml cyclohexylmethyl dimethoxysilane (CMMS) as an external donor and 30 ml n-pentane were mixed and allowed to react for 5 minutes. Half of the mixture was then added to the polymerization reactor and the other half was mixed with about 20 mg of a catalyst component according to Table 1. After additional 5 minutes the catalyst/TEA/donor/n-pentane mixture was added to the reactor. The Al/Ti mole ratio was 250 mol/mol and the Al/CMMS mole ratio was 10 mol/mol. 70 mmol hydrogen and 1400 g propylene were introduced into the reactor and the temperature was raised within ca 15 minutes to the polymerization temperature of 80° C. The polymerization time after reaching polymerization temperature was 60 minutes, after which the polymer formed was taken out from the reactor.

Polymerization results are disclosed in Table 1.

TABLE 1

| Polymerization EXAMPLE | CAT. COMP of Ex. | Activity kgPP/ g cat. | XS wt % | MWD | $MFR_{2.16}$ g/10 min | $M_w$ g/10 min | $M_n$ g/10 min | $M_z$ g/10 min |
|---|---|---|---|---|---|---|---|---|
| 6 | 2 | 28.7 | 1.3 | 3.4 | 4.7 | 326000 | 96300 | 647000 |
| 7 | 3 | 26.4 | 1.5 | 3.2 | 7.1 | 289000 | 91000 | 608000 |
| 8 | 4 | 35.4 | 1.2 | 3.1 | 6.0 | 299000 | 95500 | 613000 |
| 9 | 5 | 25.6 | 1.7 | 3.0 | 8.3 | 273000 | 90400 | 526000 |

We claim:

1. Process for preparing an olefin polymerization catalyst component in the form of particles having a predetermined average size range of 5 to 200 μm, said process comprising the steps of:
   a) preparing a solution of a complex of a Group 2 metal and an electron donor by reacting a compound of said metal with said electron donor or a precursor thereof in an organic liquid reaction medium,
   b) adding said solution of said complex to at least one compound of a transition metal to produce an emulsion, wherein the dispersed phase, of which is in the form of droplets, contains more than 50 mol % of the Group 2 metal in said complex,
   c) agitating the emulsion in order to maintain the droplets of said dispersed phase within said predetermined average size range,
   d) solidifying said droplets of the dispersed phase,
   e) washing the solidified particles at least once,
   f) drying the solidified particles or slurring the solidified particles to an oily liquid without drying and optionally
   g) recovering the dried or slurried solidified particles of the olefin polymerization catalyst component,
wherein $H_2$-gas is added to at least one of the production steps a) to g), and wherein said catalyst component is produced under oxygen and moisture free conditions.

2. The process according to claim 1, wherein during the catalyst component preparation optionally an aluminium compound having a general formula $AlR_{3-n}X_n$, wherein R stands for a straight chain or branched alkyl or alkoxy group having 1 to 20, with at least one R being an alkyl group, X independently represents a residue selected from the group of halogen, and n stands for 0, 1, 2 or 3, and/or a magnesium compound of the general formula $MgR_{2-n}X_n$, where each n is 0 or 1, and each R are same or different alkyl groups with 1 to 8 carbon atoms and X is halogen, and/or a phosphorous compound comprising phosphorous in the oxidation state +3 or +5 of the formula $O=P(OR)_3$, wherein the three residues R may be identical or different and may be selected among alkyls, alkenyls, aryls, phenyls with 1 to 20 C— atoms, wherein the groups optionally may be substituted once or twice, is added at any stage before drying or slurring the solidified particles in step f).

3. A process according to claim 1, wherein additionally ethylene is added during step e) and/or f) and/or step g).

4. A process according to claim 1, wherein $H_2$ is added in form of a Formier gas with a Vol %-ratio between $N_2$ and $H_2$ from 95:5 to 70:30.

5. A process according to claim 2, wherein $H_2$ is added, optionally in the presence of the aluminium compound and/or the magnesium compound and/or the phosphorous compound,
- during steps a) to g) or
- during steps a) to f) or
- only during washing step e), optionally in the presence of ethylene, or
- only during drying in step f), optionally in the presence of ethylene, or
- only during preparing the oil slurry in step f), optionally in the presence of ethylene, or
- only during step g), optionally in the presence of ethylene, or
- during washing step e) and during step f) and/or step g), optionally in the presence of ethylene.

6. A process according to claim 1, wherein the solidified particles are washed in step e) at least once up to six times with a hydrocarbon, which is selected from aromatic and aliphatic hydrocarbons.

7. A process according to claim 6, wherein the solidified particles are washed in step e) first with toluene and in the subsequent washing procedures with heptane and/or pentane.

8. A process according to claim 1, wherein said electron donor in step a) is a mono- or diester of an aromatic carboxylic acid or diacid and wherein said aromatic carboxylic acid ester or diester is formed in situ by reaction of an aromatic carboxylic acid chloride or diacid dichloride with a $C_2$-$C_{16}$-alkanol and/or diol and said Group 2 metal is magnesium and wherein the preparation of the Group 2 metal complex is carried out at a temperature of 20° to 80° C. in an organic liquid comprising a $C_6$-$C_{10}$ aromatic hydrocarbon or mixture of a $C_6$-$C_{10}$ aromatic hydrocarbon and a $C_5$-$C_8$ aliphatic hydrocarbons.

9. The process according to claim 1, wherein said Group 2 metal complex and said transition metal compound are reacted at a temperature of 10° to 60° C. in step b) and said metal complex is a magnesium complex and said transition metal compound is a Group 4 metal compound.

10. A process according to claim 1, wherein said emulsion of step b) is composed of a first dispersed phase which is a toluene/$TiCl_4$-insoluble-oil having a Group 4 metal/Mg mol ratio greater than 0.1 and less than 10 and a second disperse phase which is an oil less dense than that of the dispersed phase and which has a Group 4 metal/Mg mol ratio of 10 to 100.

11. A process according to claim 2, wherein in step c), the emulsion is agitated in the presence of an emulsion stabilizer and/or a turbulence minimizing agent, said emulsion stabilizer is a surfactant, which comprises an acrylic polymer and/or methacrylic polymer and said turbulence minimizing agent is selected from the group consisting of polymers of octane, nonene, decene, undecene, dodecene, copolymers and mixtures of polymers thereof.

* * * * *